(12) United States Patent
Nurmela

(10) Patent No.: US 11,121,905 B2
(45) Date of Patent: Sep. 14, 2021

(54) MANAGING DATA SCHEMA DIFFERENCES BY PATH DETERMINISTIC FINITE AUTOMATA

(71) Applicant: Forcepoint LLC, Austin, TX (US)

(72) Inventor: Kari J. Nurmela, Helsinki (FI)

(73) Assignee: FORCEPOINT LLC, Austin, TX (US)

( * ) Notice: Subject to any disclaimer, the term of this patent is extended or adjusted under 35 U.S.C. 154(b) by 66 days.

(21) Appl. No.: 16/541,304

(22) Filed: Aug. 15, 2019

(65) Prior Publication Data

US 2021/0051054 A1 Feb. 18, 2021

(51) Int. Cl.
*H04L 12/24* (2006.01)
*H04L 12/939* (2013.01)

(52) U.S. Cl.
CPC ........ *H04L 41/0266* (2013.01); *H04L 49/552* (2013.01); *H04L 49/555* (2013.01)

(58) Field of Classification Search
CPC .................................................. H04L 41/0266
USPC ......................................................... 709/223
See application file for complete search history.

(56) References Cited

U.S. PATENT DOCUMENTS

| | | | |
|---|---|---|---|
| 8,805,769 B2 | 8/2014 | Ritter et al. | |
| 9,971,822 B1 | 5/2018 | Deardeuff et al. | |
| 9,990,391 B1 | 6/2018 | Cole et al. | |
| 10,324,905 B1 | 6/2019 | Ross et al. | |
| 10,430,111 B2 | 10/2019 | Stevens et al. | |
| 2006/0136570 A1* | 6/2006 | Pandya | H04L 69/16 709/217 |
| 2006/0259508 A1* | 11/2006 | Sikdar | G06F 16/90344 |
| 2009/0106183 A1* | 4/2009 | Estan | H04L 63/1416 706/48 |
| 2016/0373293 A1 | 12/2016 | Kushmerick et al. | |

FOREIGN PATENT DOCUMENTS

| | | |
|---|---|---|
| CN | 102282542 A | 12/2011 |
| CN | 108885545 A | 11/2018 |
| JP | 2006351002 A | 12/2006 |
| WO | 2017091774 | 6/2017 |

* cited by examiner

*Primary Examiner* — David R Lazaro
*Assistant Examiner* — Zia Khurshid
(74) *Attorney, Agent, or Firm* — Jackson Walker LLP; Christopher J. Rourk

(57) ABSTRACT

A method for migrating a data schema comprising combining a first deterministic finite automaton with a second deterministic finite automaton to generate a modified deterministic finite automation. Identifying a state of the modified deterministic finite automaton without computed followers. Computing a new vector of original states for each state of the modified deterministic finite automaton corresponding to the identified state.

16 Claims, 2 Drawing Sheets

MANAGING DATA SCHEMA DIFFERENCES BY PATH DETERMINISTIC FINITE AUTOMATA

TECHNICAL FIELD

The present disclosure relates generally to data services, and more specifically to a system and method for managing data schema differences by path determinstic finite automata.

BACKGROUND OF THE INVENTION

Schema are used to describe the structure of data in information processing systems. While these schema have utility, when changes are made to the schema, the utility associated with the original schema is not easily applied to the modified schema.

SUMMARY OF THE INVENTION

A method for migrating a data schema, such as a data schema associated with a firewall, is disclosed. The method includes combining a first deterministic finite automaton (DFA), such as a DFA associated with a schema of the firewall or any other suitable DFA, with a second DFA. The second DFA can be associated a modified version of the firewall that has a modified schema that is associated with the original schema but which contains modifications and additions. A modified DFA is then generated. A state of the modified DFA that is without computed followers is then determined. A new vector of original states for each state of the modified DFA corresponding to the identified state is then computed, such as to migrate data from the first DFA to the modified DFA.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
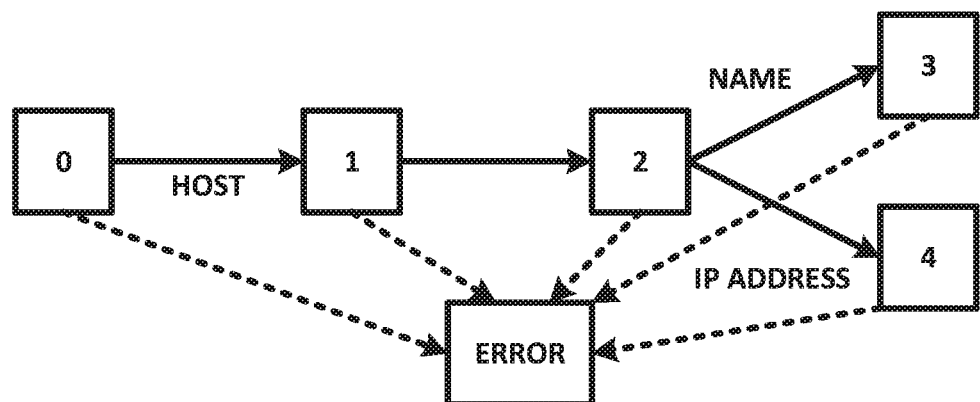
FIG. 1 is a diagram of a DFA corresponding to a data tree format, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

To describe the structure of data in information systems, various schema formats can be used. For example, JavaScript Object Notation (JSON) data can be described by various JSON schema formats, XML can be described by XML schema, or other schema formats such as DTD or Relax NG can be used. GraphQL schema is another technology that can be used to describe data content (in JSON) and to define interfaces of how to access it.

These schema formats can be used to define what kind of attributes the data elements can have. The attributes can be structural, and the schema can define the structure of the data. Validation of the data against a given schema can be performed by checking that the structure of the data corresponds to the schema.

The schemas can also provide metadata that is associated to the data to be handled. For example the schema may indicate that the "ip_address" attribute of a "host" element is a string that should match to a regular expression requiring that the string follows the syntax for either IPv4 or IPv6 address. In this example embodiment, the associated metadata can support the validation of the data, so that only valid IPv4 or IPv6 addresses are allowed in that attribute.

The metadata does not need to be limited to validation, and can provide 1) information how to render the values in the user interface, 2) the default value of the attribute, 3) the function or class name that can perform a required operation for that attribute, 4) executable code related to that piece of data or other suitable data or functions.

When new features in a component of the system are developed and old features extended or removed, there may be a need to change the structure of the data that is used to configure the component or other related data such as metadata. Such changes can also require a change to any associated schemas. Corresponding configuration data may also need to be adjusted or "migrated," or the component using the data may lack the ability to use the new data if it does not conform to the schema version that was in use when the component was implemented.

Often, there is no linear version history in the schema versions. For example, features may have been developed in parallel, products may have been released independently, different products may release related features in different order, upgrades in a distributed environment may be deployed in a delayed fashion or other implementation variables may exist. These variables can cause the number of concurrent schema version combinations grow.

The present disclosure uses deterministic finite automata (DFAs) constructed from the schemas. The DFAs can be constructed to allow them to be used to track the associated metadata when going through data that conforms to the schema (and to the DFA). These kinds of DFAs are referred to as "path DFAs," because a path in the DFA, starting from the initial state, is a valid path within the data, starting from the root of the data, to an attribute within the data.

The present disclosure allows differences between schemas with path DFAs to be analyzed, and multiple path DFAs to be used to construct new path DFAs suitable for handling data corresponding to multiple schema versions without migrating the data itself into a single schema version. In one embodiment, the present disclosure can use JSON as the data format, but the same technique can be used also with other structural data formats.

JSON is a simple structural data format that contains scalar values (like numbers and strings) and structural values. Arrays can include lists of values, objects that map names (strings) to values and other suitable data. For example, to store a list of "host" elements in JSON, where each element contains a "name" attribute and an "ip_address" attribute, this data can be represented as an array of objects, containing two host elements:

```
{
    "host": [
        {
            "name": "host1",
            "ip_address": "10.0.0.1"
        },
        {
            "name": "host2",
            "ip_address": "10.0.0.2"
        }
    ]
}
```

In this example, the array in a "host" attribute of a top-level object can also be used to accommodate other elements in addition to hosts. A structural value like this can be modelled as a data tree, where the root of the data tree can be the top-level value, and the branches of the data tree can be the attributes (in an object) or list items (in an array) of the value. The leaves of the data tree can be the scalar values. Likewise, other suitable configurations can also or alternatively be used. The present disclosure allows a DFA to be formed for the possible paths (path DFA) from the data root of the data tree to the data leaves. The labels on the arcs of the DFA can be the attribute names, a special value "—" corresponding to selecting a list element, or other suitable data.

FIG. 1 is a diagram of a DFA 100 corresponding to a data tree format, in accordance with an example embodiment of the present disclosure. DFA 100 includes a well-defined DFA state for each JSON value in the data. As shown, state 0 is an initial state that corresponds to the JSON data structure, state corresponds to a "host" list, state 2 corresponds to an element on that list, state 3 corresponds to a "name" attribute, and state 4 corresponds to an "ip_address" attribute.

In addition to these states, there is also an error state. The transitions leading to the error state are shown with dotted lines, and it is understood those transitions correspond to all the labels not shown explicitly in the diagram. For example, a transition for "host" from state 2 (where an attribute named "host" within the host element is not allowed by the schema) will take the dotted line transition to the error state, because there is no explicit transition from state 2 labeled "host."

Metadata can be attached to the states of the DFA. In one example embodiment, a regular expression for the IP address string can be attached to state 4 in the DFA to support validation of the data. In another example embodiment, a function or a class name can be attached to state 4 to indicate how to parse the IP address string into a native representation in the component that uses the data. Likewise, metadata defining other suitable functions or data can also or alternatively be provided.

The corresponding transitions in the DFA can then be used when traversing through that data. For example if there is a pointer to a list element on the "host" list, that pointer can also be used as a pointer to the corresponding DFA state (state 2 in DFA 100). For the "ip_address" attribute in the JSON value, the corresponding transition "ip_address" in state 2 can also be utilized to end up at state 4, which can contain the metadata of the accessed JSON value.

In addition to attribute names, the transitions in the DFA can be values of a discriminator field, when the value of the attribute can be one of several types, which is also referred to as polymorphism. Each attribute value type can have a separate DFA state, with followers that correspond to the allowed attributes of that value type.

The transitions in the DFA can also be used as labels corresponding to enumerated values, so that each enumerated value can have different metadata. For example, in addition to string labels, boolean and integer values can be used as labels, to attach specific metadata to specific values.

The transitions in the DFA can also be used as an identifier of a known element (such as a universally unique identifier values or UUID). Using the transitions in this manner allows specific metadata to be attached to a data element that is known by its identifier at the time the schema was created. The schema may be recursive, which can allow nesting to be used in the data. The recursion can be naturally handled by the path DFA by making a loop in the DFA.

Path DFAs can be used for tracking metadata while transiting through the data corresponding to the schema. When there is more than one DFA, such as when different DFAs originate from different schema versions or are produced directly by the programmer, then those DFAs can be combined into a new path DFA that can be used to track the metadata. This process allows multiple concurrent schema versions to be accommodated, with additions and overrides to the original schemas being indicated where they exist, and to allow data schema differences to be managed in a system that utilizes those data schema.

In one example embodiment, a combined DFA can be constructed using the following algorithm. The states in the combined DFA can correspond to vectors of states of the original DFAs, where there is one state for each original DFA in that vector. First, the initial combined state can correspond to the vector of the initial states of the original DFAs. Second, a state S can be taken in the combined DFA whose followers have not yet been computed. If there are no such states, the combined DFA is complete and the algorithm ends.

Third, for each original DFA state that corresponds to the state S, and for each follower of the original state, a new vector of original states can be computed, where the original state has been replaced by its follower.

After this step, the metadata from the original states can be merged, and the resulting combined state can be checked to determine whether it is acceptable. The merging of metadata from the original states can utilize priorities between the DFAs or other application specific logic, if there are conflicts in the metadata definitions.

The states are then checked to determine if they are acceptable. In one example embodiment, if there were conflicts that could not be automatically resolved, the state may be rejected and an error indication can be generated, to indicate to a programmer that additional conflict resolution information needs to be provided. In another example embodiment, if the data structure must correspond to the combined DFA and also to one or more of the original DFAs, the combined states can be rejected if the vector includes error states in any of the original DFAs. This example includes the case where all the original DFAs are such, and an intersection is made of the original DFAs, taking only the common part of all of the original schemas into the combined path DFA.

In another example embodiment, a programmer can indicate that only some DFAs should be allowed to add new paths to the corresponding combined DFA. In that case, the state is not acceptable if all such DFAs are in an error state in the vector. In yet another embodiment, to detect differences between path DFAs, output can be generated when the metadata attached to the original states differs, or when one or more of the original path DFAs do not have a transition that the remaining original path DFAs have.

If it is determined that the state is acceptable, it can be added to the combined DFA, if it is not yet there, and a transition can be added from state S to the new state, with the label taken from the transition in the original DFA. This process is repeated for each original DFA state that corresponds to a state S in the second step.

Figure 2:
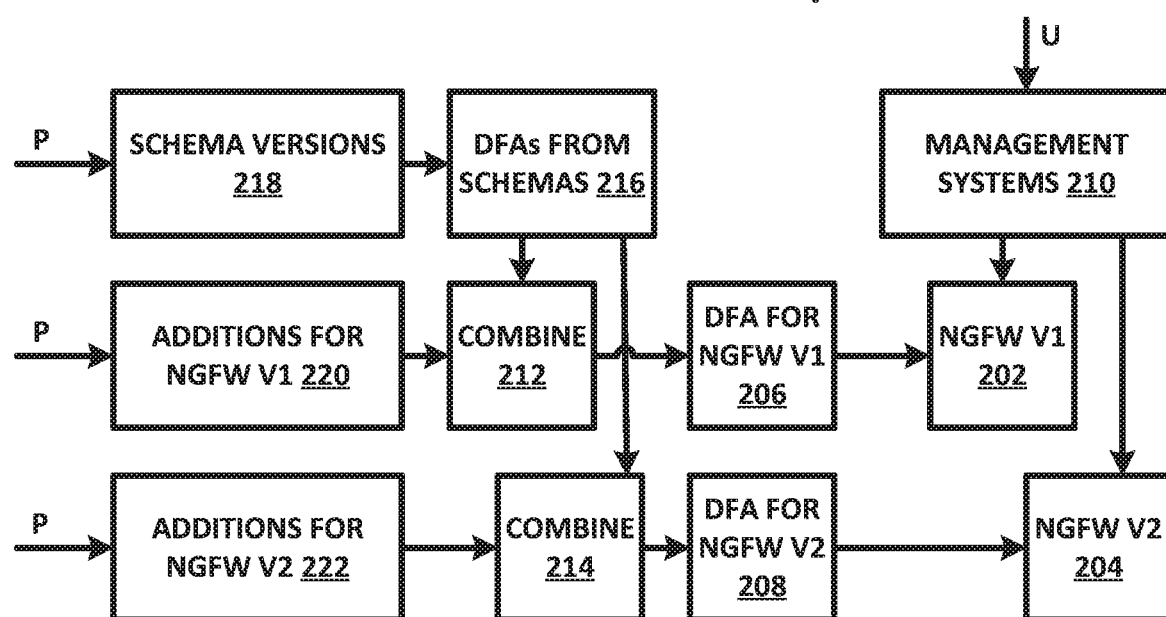
FIG. 2 is a diagram of a system for migrating a first next generation firewall (NGFW) schema to a second NGFW schema, in accordance with an example embodiment of the present disclosure.

FIG. 2 is a diagram of a system 200 for migrating a first next generation firewall (NGFW) schema to a second NGFW schema, in accordance with an example embodiment of the present disclosure. System 200 includes NGFW V1 202, NGFW V2 204, DFA for NGFW V1 206, DFA for NGFW V2 208, management systems 210, combiner 212, combiner 214, DFAs from schemas 216, schema versions 218, additions for NGFW V1 220 and additions for NGFW V2 222, each of which can be implemented in hardware or a suitable combination of hardware and software.

NGFW V1 202 can be implemented as one or more algorithms that are configured to operate on a processor to provide next generation firewall functionality. In one example embodiment, the next generation firewall functionality can include one or more data structures that are used to identify permitted IP addresses, blocked IP addresses and rules that are used to determine whether data communications to and from an IP address should be permitted. This firewall function prevents potentially malicious actors from gaining access to a network, imposes controls on the types of content that network users can access outside of a network and performs other suitable firewall functions.

NGFW V2 204 can be implemented as one or more algorithms that are configured to operate on a processor to provide a new version of the next generation firewall functionality provided by NGFW V1 202. In one example embodiment, the next generation firewall functionality can include one or more modified or new data structures that are used to identify permitted IP addresses, blocked IP addresses and rules that are used to determine whether data communications to and from an IP address should be permitted, where the modified or new data structures are similar to the original data structures but where they do not directly replace those data structures. This modified or new firewall function typically augments the ability to prevent potentially malicious actors from gaining access to a network, imposes controls on the types of content that network users can access outside of a network and performs other suitable firewall functions, but may include new functionality that is not directly related to functionality in NGFW V1 202.

DFA for NGFW V1 206 can be implemented as one or more algorithms that are configured to operate on a processor to provide a deterministic finite automaton for NGFW V1 202, such as to provide a schema and associated metadata that can be used by NGFW V1 202 to provide firewall functions. In one example embodiment, DFA for NGFW V1 206 can identify data (such as a list with associated names, IP addresses and metadata) that are associated with states, such as a host state.

DFA for NGFW V2 208 can be implemented as one or more algorithms that are configured to operate on a processor to provide a deterministic finite automaton for NGFW V2 208, such as to provide a schema and associated metadata that can be used by NGFW V2 208 to provide firewall functions. In one example embodiment, DFA for NGFW V2 208 can identify data (such as a list with associated names, IP addresses and metadata) that are associated with states, such as a host state.

Management systems 210 can each be implemented as one or more algorithms that are configured to operate on a processor to produce configuration data that can be used by a firewall system or other suitable functions. In one example embodiment, management systems 210 can be associated with different versions of the firewall and use different schemas for each firewall, and can produce different configuration data.

Schema versions 218 can be implemented as one or more algorithms that are configured to operate on a processor to identify schemas associated with NGFW V1 202, NGFW V2 204 and other suitable schemas. In one example embodiment, schema versions 218 can generate a user display that allows a user to see existing schemas for NGFW V1 202, new schemas for NGFW V2 204 or other suitable data, and to perform suitable modifications to the data, such as to correct an inaccurate representation of a schema, to design a new schema or for other suitable purposes.

Additions for NGFW V1 220 can be implemented as one or more algorithms that are configured to operate on a processor to identify additions for schemas associated with NGFW V1 202 and other suitable schemas. In one example embodiment, additions for NGFW V1 220 can generate a user display that allows a user to see existing schemas for NGFW V1 202, additions to those schemas for NGFW V2 204 or other suitable data, and to perform suitable modifications to the data, such as to correct an inaccurate representation of a schema, to design a new schema or for other suitable purposes.

Additions for NGFW V2 222 can be implemented as one or more algorithms that are configured to operate on a processor to identify additions for schemas associated with NGFW V2 204 and other suitable schemas. In one example embodiment, additions for NGFw V2 224 can generate a user display that allows a user to see existing schemas for NGFW V1 202, additions to those schemas for NGFW V2 204 or other suitable data, and to perform suitable modifications to the data, such as to correct an inaccurate representation of a schema, to design a new schema or for other suitable purposes.

In one example embodiment, the algorithms of management systems 210, NGFW V1 206 and NGFW V2 208 can be provided as part of software applications that are used by a programmer to migrate a data schema in scheme versions 218 from NGFW V1 206 to NGFW V2 208. The programmer can also specify the schema that is to be used by management systems 210, which can convert the schema into a native representation, such as an internal path DFA. The firewall-specific additions to the schema for NGFW V1 202 and NGFW V2 204 can be provided as path DFAs, schemas that are converted into path DFAs or in other suitable manners.

System 200 results in path DFAs from the schema versions, and path DFAs containing additional firewall version specific information. For each firewall version these path DFAs are combined in the "combine" step using the algorithm illustrated above. The resulting firewall version-specific path DFAs (such as DFA for NGFW V1 206 and DFA for NGFW V2 208) can be copied to the firewalls (such as NGFW V1 202 and NGFW V2 204, respectively), such as when the firewall is installed, later as an update or in other suitable manners.

When a user uses one of management systems 210, the management system provides configuration data according to its own schema version, and the configuration data is copied to the corresponding firewall NGFW V1 202 or NGFW V2 204. The firewall can handle the configuration regardless of which management system (and schema version) it comes from, because the path DFA is combined from all the supported schema versions, and it contains the necessary firewall-specific metadata.

For example, if there is a new feature that is not supported yet in a firewall version, the metadata in the schema can provide an indication associated with the firewall that can be used to provide an appropriate error message to the user that is operating the management system 210. If there are additions that can be safely ignored, the metadata can indicate so. If the firewall software has changed between the versions so that a specific configuration data element is handled by a different function or class, each of the firewall version-specific combined DFAs (DFA for NGFW V1 206 and DFA for NGFW V2 208) indicates which function or class to use in the associated firewall version.

Path DFAs that correspond to large data models are typically rather sparse in the sense that in most states there are only a few outgoing transitions leading to non-error states, but there can be thousands of transitions in each state leading to the error state. This configuration does not provide an optimal use of computing resources. Instead of listing all the transitions in the path DFAs, it is possible to leave out the transitions to the error state, and also the error state itself. The DFA combining algorithms combiner 212 and combiner 214 can handle this kind of "sparse" path DFA presentation. For example, if a transition cannot be found in the original DFA state, it is assumed to lead to a fictional error state in the original DFA, and it can be represented by a null pointer in the vector of the original DFA states. The resulting combined DFA can similarly be sparse, and missing transitions can be assumed to lead to the fictional error state.

The path DFAs can be quite large with a large data model. But since they are DFAs, it is easy to employ standard DFA minimization algorithms to find a corresponding minimal DFA. It is also possible to use the sparse DFA representation by adjusting the minimization algorithm. For example, the well-known Hoperoft's DFA minimization algorithm can be adjusted to handle the sparse DFA by taking the initial partitioning of the states to consist of the non-error states partitioned by their metadata. In this manner, Hoperoft's algorithm doesn't need the fictional error state or any transitions leading to it, and can run directly on the sparse representation of the DFA.

Instead of traversing through the whole data, it is possible to use an index to the data. For example, if the data elements have identifiers such as UUID values, a lookup index can be created to quickly find the configuration data corresponding to a given UUID. The path DFAs can utilized together with the index by storing pointer to the path DFA state together with the pointer to the data element with the UUID value. In this manner, if a UUID value is used to retrieve the corresponding configuration data element, the path DFA state is received, too, and the DFA can be used to track the metadata while going through the configuration data element.

The path DFAs can also be used for test data coverage analysis. In this example embodiment, it is possible to keep track of which DFA states have been visited when traversing through the test configuration data. If there are states that were not visited, that status provides an indication of a lack of coverage for that state in the test data. The lack of coverage can be more serious if the unvisited DFA states have metadata indicating that they trigger code execution in the consumer of the data (like functions or class names). With combined path DFAs and the firewall example above, it is possible to determine if there is lack of coverage in the version compatibility testing.

Figure 3:
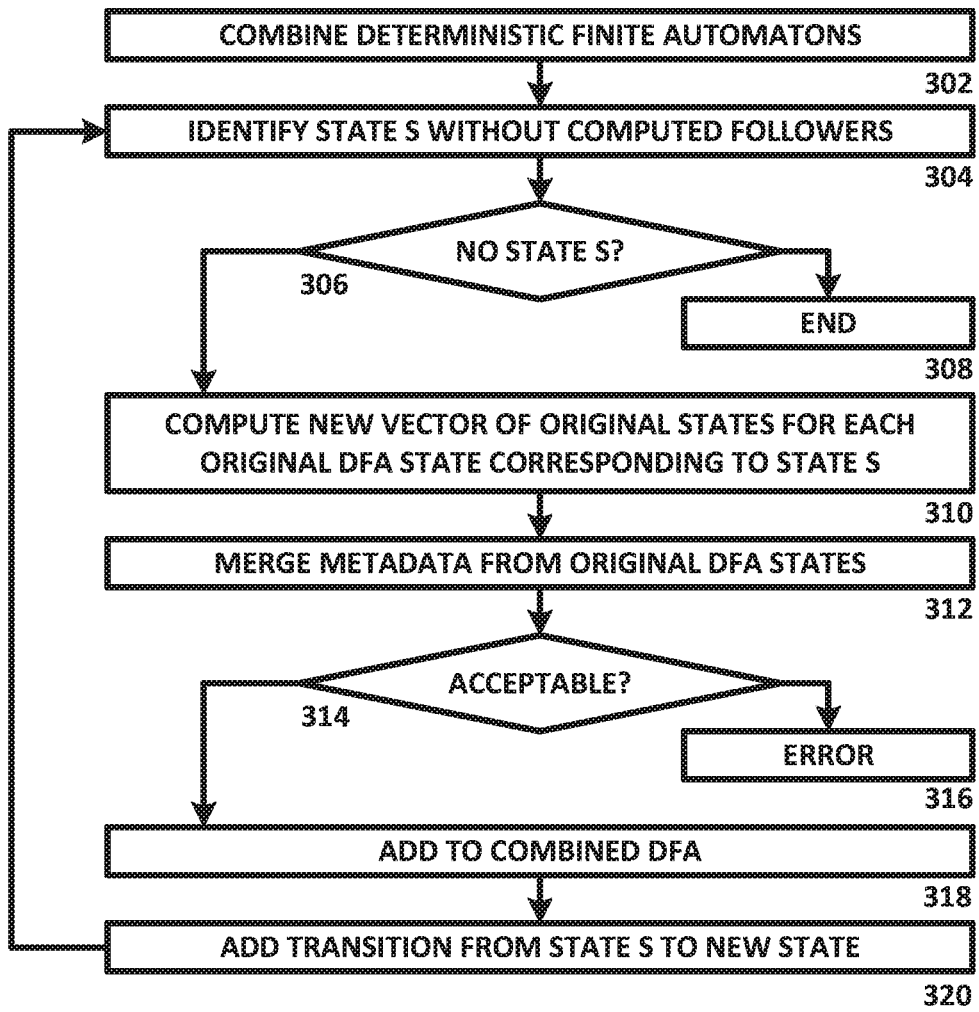
FIG. 3 is a diagram of an algorithm for migrating schema data in accordance with an example embodiment of the present disclosure.

FIG. 3 is a diagram of an algorithm 300 for migrating schema data in accordance with an example embodiment of the present disclosure. Algorithm 300 can be implemented on one or more processors.

Algorithm 300 begins at 302, where DFAs for two or more different applications are combined. In one example embodiment, the DFAs can be associated with versions of NGFWs or other suitable applications. In another example embodiment, one state can be provided for each original DFA in a vector of states of the original DFAs. The algorithm then proceeds to 304.

At 304, a state S without computed followers is identified. In one example embodiment, a sequence of states can be analyzed to determine the next state S that does not have computed followers, a list of states without computed followers can be queried or other suitable processes can also or alternatively be used. The algorithm then proceeds to 306.

At 306, it is determined whether no state S was identified. In one example embodiment, it can be determined whether a null state was returned in response to a search, whether an end of list was returned or if other suitable data was returned. If no state S was identified, then the algorithm proceeds to 308 and ends, otherwise the algorithm proceeds to 310.

At 310, a new vector of original states is computed for each original DFA state corresponding to state S. In addition, a new vector of original states can be computed for each follower of the original states or other suitable vectors of original states can be computed. The algorithm then proceeds to 312.

At 312, the metadata from the original DFA states is merged. In one example embodiment, the metadata can be merged using one or more combiner algorithms operating on a processor or in other suitable manners. The combiner algorithms can utilize priorities between the DFAs or other application specific logic when merging the metadata between the original DFA states, if there are conflicts in the metadata definitions, or other suitable processes can also or alternatively be used. The algorithm then proceeds to 314.

At 314, it is determined whether the merged data is acceptable. In one example embodiment, if there were conflicts that could not be automatically resolved, the state can be rejected and an error indication can be generated at 316 to indicate to a programmer that additional conflict resolution information needs to be obtained. If a data structure corresponding to the combined DFA is required that also corresponds to one or more of the original DFAs, the combined states can be rejected if the vector includes error states in any of the original DFAs (such as the case where an intersection of the original DFAs is made, taking only the common part of all of the original schemas into the combined path DFA). The programmer can also be provided with a control to indicate that only some DFAs should add new paths to the corresponding combined DFA, such as a tool that allows the programmer to select a corresponding status for those DFAs. In that case, the state is not acceptable if all such DFAs are in an error state in the vector. An output can also or alternatively be generated when the metadata attached to the original states differs, when one or more of the original path DFAs do not have a transition that the remaining original path DFAs have, or in other suitable manners. If the merged data is not acceptable, the algorithm proceeds to 316, otherwise the algorithm proceeds to 318.

At 318, the data is added to the combined DFA. In one example embodiment, the data is added to the combined DFA only when it is not already present. The algorithm then proceeds to 320.

At 320, a transition from state S to the new state is added. In one example embodiment, the transition from state S to the new state can be added with a label taken from the transition in the original DFA or in other suitable manners. The algorithm then returns to 304.

While algorithm 300 is shown as a flow chart algorithm, it can also or alternatively be implemented using object oriented programming, state diagrams, ladder diagrams or in other suitable manner.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for migrating a data schema, comprising: combining a first deterministic finite automaton configured for use in firewall processing of network data at a first network firewall with a second deterministic finite automaton configured for use in firewall processing of network data at a second network firewall to generate a modified deterministic finite automation; identifying a state of the modified deterministic finite automaton without computed followers; and computing a new vector of original states for each state of the modified deterministic finite automaton corresponding to the identified state to migrate data from the first deterministic finite automaton to the second deterministic finite automaton for use in firewall processing; and merging firewall-specific metadata from the first deterministic finite automaton with firewall-specific metadata from the second deterministic finite automaton for each state of the modified deterministic finite automaton corresponding to the identified state.

2. The method of claim 1 further comprising: determining whether the merged metadata is an error state associated with an unsupported feature; and generating a user direction on a user interface device identifying the error state associated with the unsupported feature if the merged metadata is the error state associated with the unsupported feature.

3. The method of claim 2 further comprising adding the merged metadata to a combined deterministic finite automaton if the merged metadata is not the error state associated with the unsupported feature.

4. The method of claim 3 further comprising generating a transition from the state of the modified deterministic finite automaton to a new state that omits a transition to the error state associated with the unsupported feature.

5. The method of claim 3 wherein determining whether the merged metadata is the error state comprises determining whether the merged metadata includes an unresolvable conflict.

6. The method of claim 3 wherein determining whether the merged metadata is the error state comprises determining whether the new vector includes an error state.

7. The method of claim 1 wherein the first deterministic finite automaton is associated with a schema of a firewall system.

8. The method of claim 1 wherein the first deterministic finite automaton is associated with a schema of a firewall system that includes at least one name and at least one Internet protocol address.

9. A system for migrating a data schema, comprising: a processor one or more processors with memory configured to execute one or more algorithms that perform the steps of: combining a first deterministic finite automaton configured for use in firewall processing of network data at a first network firewall with a second deterministic finite automaton configured for use in firewall processing of network data at a second network firewall to generate a modified deterministic finite automation identifying a state of the modified deterministic finite automaton without computed followers; and computing a new vector of original states for each state of the modified deterministic finite automaton corresponding to the identified state to migrate data from the first deterministic finite automaton to the second deterministic finite automaton for use in firewall processing of network data; and merging firewall-specific metadata from the first deterministic finite automaton with firewall-specific metadata from the second deterministic finite automaton for each state of the modified deterministic finite automaton corresponding to the identified state.

10. The system of claim 9 wherein the one or more algorithms are further configured to perform the steps of: determining whether the merged metadata is an error state in a vector: and generating a user direction on a user interface device identifying the error state if the merged metadata is an error state.

11. The system of claim 10 wherein the one or more algorithms are further configured to perform the step of adding the merged metadata to a combined deterministic finite automaton if the merged metadata is not an error state.

12. The system of claim 11 wherein the one or more algorithms are further configured to perform the step of generating a transition from the state of the modified deterministic finite automaton to a new state.

13. The system of claim 10 wherein the one or more algorithms are further configured to perform the step of determining whether the merged metadata includes an unresolvable conflict.

14. The system of claim 10 wherein the one or more algorithms are further configured to perform the step of determining whether the new vector includes an error state.

15. The system of claim 9 wherein the first deterministic finite automaton is associated with a schema of a firewall system.

16. The system of claim 9 wherein the first deterministic finite automaton is associated with a schema of a firewall system that includes at least one name and at least one Internet protocol address.

* * * * *